[19] United States Patent
Peifer et al.

[11] 3,769,852
[45] Nov. 6, 1973

[54] FOOT PEDAL ACTUATING MECHANISM
[75] Inventors: Gary S. Peifer, Waynesville; James L. Hughes, Warrensburg; Virgil H. Johnson, Decatur, all of Ill.
[73] Assignee: Caterpillar Tractor Co., Peoria, Ill.
[22] Filed: Aug. 21, 1972
[21] Appl. No.: 282,137

[52] U.S. Cl.......................... 74/512, 74/539, 74/560
[51] Int. Cl................................................ G05g 1/14
[58] Field of Search..................... 74/104, 107, 524, 74/514, 539, 560, 512, 513, 542

[56] References Cited
UNITED STATES PATENTS
2,532,861  12/1950  Siever................................ 74/513 X Primary Examiner—Milton Kaufman
Assistant Examiner—Frank H. McKenzie, Jr.
Attorney—Paul S. Lempio

[57] ABSTRACT

A foot actuated control pedal has a transversely disposed locking pin secured thereon which is adapted to cooperate with a T-shaped slot formed on a floor plate to lock the pedal in an operative position when the pedal is depressed and retracted. The pedal is unlocked when it is depressed and moved forwardly against the biasing force of a compression spring and is returned to its upper, neutral position under the influence of a torsion spring.

8 Claims, 3 Drawing Figures

PATENTED NOV 6 1973
3,769,852
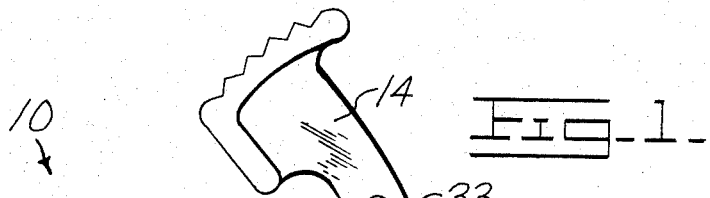
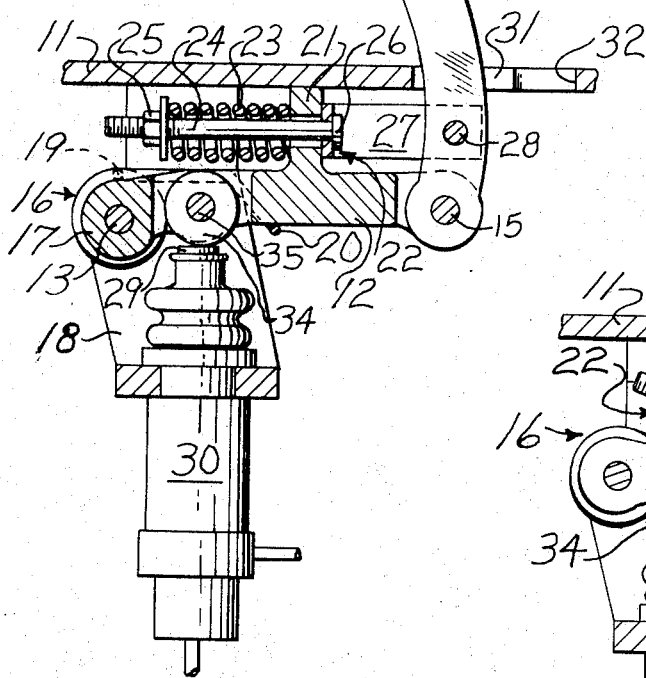
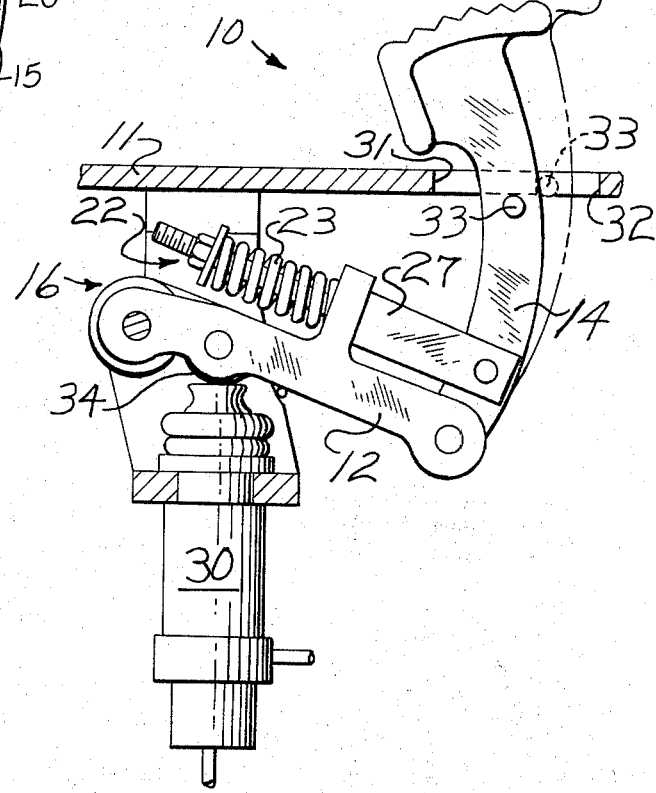
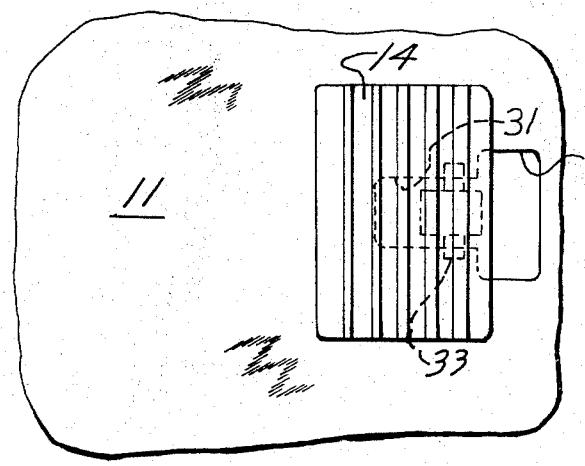

FOOT PEDAL ACTUATING MECHANISM

BACKGROUND OF THE INVENTION

This invention relates to a foot pedal actuating mechanism and more particularly relates to a foot actuated control pedal which can be selectively locked in an operative position to continuously actuate a control valve.

The operator of an earthmoving vehicle, such as a motor grader, must normally use both hands to maintain positive control of the vehicle. Thus, the operator finds great difficulty in releasing a conventional foot actuated control mechanism which normally requires means for releasing same by hand. Such mechanisms are exemplified by conventional hand releasable ratchet mechanisms employed in automohive parking brake assemblies. In addition, the ratchet mechanisms and like devices are susceptible to malfunctions when subjected to adverse environmental conditions, normally encountered during earthworking operations.

SUMMARY OF THIS INVENTION

An object of this invention is to provide a non-complex and economical actuating mechanism capable of fail-proof operation over an extended period of time and under adverse operating conditions. The actuating mechanism comprises a stationary support, including a plate member, a lever pivotally mounted on the support, a control member projecting through the plate member, first biasing means connected between the support and lever for urging the lever and control member to a first position, second biasing means connected between the lever and control member for urging the control member to a second position and cooperating locking means formed on the control member and plate member for selectively locking the control member in the second position and for releasing and permitting the control member to return to the first position under the influence of the first spring means.

In the preferred embodiment of this invention, the control member comprises a foot pedal and the locking means comprises a locking pin secured to the foot pedal and a cooperating T-shaped slot formed through the plate member. In addition, the lever is preferably adapted to depress a control element, reciprocally mounted in a control valve, upon depression of the pedal to its second, operative position.

BRIEF DESCRIPTION OF THE DRAWINGS

Other objects of this invention will become apparent from the following description and accompanying drawings wherein:

FIG. 1 is a partially sectioned, side elevational view of a foot pedal actuating mechanism disclosed in a first or neutral condition of operation;

FIG. 2 is a view similar to FIG. 1, but showing the foot pedal actuating mechanism in a second, operative condition of operation; and FIG. 3 is a top plan view of a foot pedal actuating mechanism as it would appear in its FIG. 2 condition of operation.

DETAILED DESCRIPTION

FIG. 1 illustrates a foot pedal actuating mechanism 10 positioned in its first or neutral condition of operation. The mechanism comprises a stationary support, comprising a floor plate member 11, having the first end of a lever 12 pivotally mounted thereon by a first pivot means or pin 13. A control member, preferably a foot pedal 14, projects upwardly through the floor plate member and is pivotally mounted on a second end of the lever by a second pivot means or pin 15.

A first biasing means 16 is operatively connected between the support and lever for urging the lever to pivot counterclockwise about pin 13 to move foot pedal 14 to a first or neutral position of operation wherein it is raised and retracted. Such biasing means preferably comprises a torsion spring mounted on a boss 17 formed integrally with a bracket 18 releasably attached to a mounting block of the support. A first end 19 of the torsion spring abuts the bracket whereas a second end 20 thereof underlies lever 12, between pivot pins 13 and 15, to urge the lever upwardly to engage a stop 21 thereof with floor plate member 11.

A second biasing means 22 is operatively connected between the lever and the foot pedal for urging the foot pedal to pivot counterclockwise about pivot pin 15 to a second, retracted and locked position, illustrated in FIG. 2. The second biasing means preferably comprises a coil spring 23 mounted on a bolt 24 to be compressed between an adjustable washer and nut 25 and stop 21. The bolt extends through an aperture formed in the stop and has its head end 26 arranged to mount the first end of a clevis 27 thereon. The second or bifurcated end of the clevis is pivotally mounted on foot pedal 14 by a third pivot means or pin 28.

Cooperating locking means are formed on the foot pedal and plate member for selectively locking the foot pedal in its FIG. 2 position, whereby a control element or plunger 29 of a fluid control valve 30 is depressed. Such locking means also permits the foot pedal to return automatically to its FIG. 1 neutral position under the influence of first biasing means 16. Such locking means preferably comprises a T-shaped slot, formed through plate member 11 (FIG. 3), having a narrow longitudinal portion 31 and a transversely disposed and substantially wider portion 32 which cooperate with a transverse stop pin 33 secured to foot pedal 14. Upon depression of the pedal, the length of the stop pin is sufficient to pass through the wider portion of the slot, but not through the narrow portion thereof.

In operation, foot pedal 14 is normally held in its raised and retracted FIG. 1 neutral position by first and second biasing means 16 and 22, respectively. In such first position of operation, control element 29 is fully extended upwardly under the influence of a coil spring (not shown) contained in control valve 30. Upon depression of the pedal by the operator to a second position, control element 29 is likewise depressed by a roller 34, rotatably mounted on lever 12 by a pivot pin 35, to actuate control valve 30 to communicate air or hydraulic fluid therethrough.

When only momentary actuation of the control valve is desired, the operator may depress the pedal against the counteracting force of torsion spring 16 until locking pin 33 abuts the outer surface of plate member 11, above longitudinally disposed slot 31. The pedal may be locked in its second position of operation (FIG. 2) by moving the pedal forwardly against the counteracting force of spring 23 to permit stop pin 33 to pass through transverse slot 32 whereupon the pedal is retracted to locate the stop pin in a position beneath longitudinal slot 31 (FIG. 3). Simultaneously therewith, spring 23 functions to retract the pedal to hold it in such a depressed and locked position. Also, torsion spring 16 will urge the pedal upwardly to engage the stop pin with the inner surface of plate member 11.

The foot pedal will remain in its FIG. 2, locked position until the operator again depresses the pedal and moves it forwardly to vertically align stop pin 33 with transverse slot 32. When the operator removes his foot from the pedal, the pedal will raise and retract automatically under the influence of springs 16 and 23. Although the above described foot pedal actuating mechanism is particularly adapted to selectively actuate air control valve 30 which is operatively connected to the differential locking mechanism of a motor grader, it should be understood that the mechanism can be adapted for the performance of numerous other control functions.

What is claimed is:

1. An actuating mechanism comprising
   a stationary support including a plate member,
   a lever,
   first pivot means pivotally mounting said lever on said support,
   a control member projecting through said plate member,
   second pivot means pivotally mounting said control member on said lever,
   first biasing means operatively connected between said support and said lever for urging said lever to pivot about said first pivot means to move said control member to a first position,
   second biasing means operatively connected between said lever and said control member for urging said control member to pivot about said second pivot means to a second position, and
   cooperating locking means formed on said control member and said plate member for selectively locking said control member in said second position and for releasing and permitting said control member to return to said first position under the influence of said first biasing means.

2. The invention of claim 1 wherein said first biasing means comprises a torsion spring having a first end attached to said support and a second end thereof engaged with said lever.

3. The invention of claim 1 wherein said second biasing means comprises a coil spring mounted between said lever and said control member.

4. The invention of claim 1 wherein said locking means comprises an irregularly shaped slot formed through said plate member and defining a narrow portion and a substantially wider portion and a stop pin secured to said control member having a length sufficient to pass through said wider portion but not through said narrow portion.

5. The invention of claim 1 further comprising a control valve having a control element positioned closely adjacent to said lever so that upon depression of said control member said lever will engage and move said control element to actuate said control valve.

6. A foot pedal actuating mechanism comprising
   a stationary support including a plate member having an irregularly shaped slot formed therethrough defining a narrow portion and a substantially wider portion,
   a pedal extending through said slot and having a stop pin secured thereon, normally disposed above said slot, said pin having a length sufficient to pass through the wider portion of said slot but not through the narrow portion thereof, and
   a lever pivotally mounted on said support, below said plate member, and having a lower end of said pedal pivotally mounted thereon.

7. The invention of claim 6 further comprising first biasing means operatively connected between said support and said lever for urging said lever upwardly toward said plate member and second biasing means operatively connected between said lever and said pedal for urging said pedal to a retracted position wherein said stop pin is normally positioned over the narrow portion of said slot.

8. The invention of claim 6 further comprising a control valve having a control element positioned adjacent to and below said lever whereby depression of said pedal will engage and move said control element by said lever to actuate said control valve.

* * * * *